US011668389B2

(12) United States Patent
Meid et al.

(10) Patent No.: US 11,668,389 B2
(45) Date of Patent: Jun. 6, 2023

(54) HYDRAULIC ARRANGEMENT FOR A VEHICLE TRANSMISSION

(71) Applicant: DEERE & COMPANY, Moline, IL (US)

(72) Inventors: Michael Meid, Waghaeusel (DE); Manuel Billich, Dischingen (DE); Thomas Busold, Bruehl (DE)

(73) Assignee: DEERE & COMPANY, Moline, IL (US)

( * ) Notice: Subject to any disclaimer, the term of this patent is extended or adjusted under 35 U.S.C. 154(b) by 123 days.

(21) Appl. No.: 17/202,635

(22) Filed: Mar. 16, 2021

(65) Prior Publication Data

US 2021/0356035 A1  Nov. 18, 2021

(30) Foreign Application Priority Data

May 14, 2020  (DE) .......................... 102020206115.7

(51) Int. Cl.
  *F16H 57/04* (2010.01)
  *F16H 61/02* (2006.01)
  *F16H 61/00* (2006.01)

(52) U.S. Cl.
  CPC ..... *F16H 57/0446* (2013.01); *F16H 61/0025* (2013.01); *F16H 61/0267* (2013.01)

(58) Field of Classification Search
  CPC ............ F16H 57/0446; F16H 61/0025; F16H 57/0435; F16H 2061/0037; F16H 61/0031; F16H 61/0206
  See application file for complete search history.

(56) References Cited

U.S. PATENT DOCUMENTS

| 5,615,553 | A  | * | 4/1997  | Lourigan ............... F15B 11/162 60/486 |
| 9,574,655 | B2 | * | 2/2017  | Hwang ................ F16H 57/0441 |
| 2005/0263352 | A1 | * | 12/2005 | Fideler ................ F16H 61/0031 184/6.1 |
| 2009/0158727 | A1 | * | 6/2009  | Bitter ...................... F04B 23/10 60/486 |
| 2009/0232673 | A1 | * | 9/2009  | Reisch ................ F16H 61/0031 417/364 |
| 2014/0290767 | A1 | * | 10/2014 | Jo ........................ F16H 61/0021 137/565.11 |
| 2018/0135743 | A1 | * | 5/2018  | Guo ..................... F16H 61/0021 |

FOREIGN PATENT DOCUMENTS

DE      102013112689 A1    10/2014

OTHER PUBLICATIONS

Extended European Search Report and Written Opinion issued in European Patent Application No. 21169947.5, dated Oct. 8, 2021, 7 pages.

* cited by examiner

Primary Examiner — Thomas E Lazo (57) ABSTRACT

A hydraulic arrangement for a vehicle transmission includes a hydraulic system path leading to a hydraulic system circuit with a system pressure, a hydraulic lubrication path leading to a hydraulic lubrication circuit with a lubrication pressure, and a branching point connected to an output side of the system and lubrication paths. A variable displacement pump or a pump combination includes at least two fixed displacement pumps hydraulically connected to an input side of the branching point, and a variable displacement pump or at least one fixed displacement pump are hydraulically connected to the output side of the branching point and integrated into the hydraulic system path.

21 Claims, 4 Drawing Sheets

HYDRAULIC ARRANGEMENT FOR A VEHICLE TRANSMISSION

RELATED APPLICATIONS

This application claims priority to German Application No. 102020206115.7, filed May 14, 2020, the disclosure of which is hereby expressly incorporated by reference in its entirety.

FIELD OF THE DISCLOSURE

The present disclosure relates to a hydraulic arrangement for a vehicle transmission.

BACKGROUND

Vehicle transmissions require a hydraulic medium (for example, oil) in order to control the clutches thereof in a hydraulic system circuit and also to ensure sufficient lubrication in a hydraulic lubrication circuit. On account of the different hydraulic requirements, a division into two circuits (system and lubrication) is appropriate in order to reduce power losses and increase efficiency.

There is a need, however, for further improving the efficiency of the functioning of a hydraulic vehicle transmission.

SUMMARY

According to the present disclosure, the hydraulic arrangement has a hydraulic system path and a hydraulic lubrication path. The system path leads to a hydraulic system circuit with a system pressure $p\_sys$, while the lubrication path leads to a hydraulic lubrication circuit with a lubrication pressure $p\_lub$. The system circuit serves in particular to control or actuate one or more clutches or a selector fork within the vehicle transmission. The lubrication circuit serves for continuous lubrication of the vehicle transmission. The two hydraulic paths are hydraulically connected to the output side of a branching point. Either a variable displacement pump or a pump combination having at least two fixed displacement pumps is hydraulically connected to the input side of the branching point. Furthermore, either a variable displacement pump or at least one fixed displacement pump is hydraulically connected to the output side of the branching point in a manner integrated into the system path.

Fixed displacement pumps displace a constant hydraulic volume upon each revolution, such that the volumetric flow remains constant at a constant rotational speed of the pump.

By contrast, in variable displacement pumps, the hydraulic displacement volume can be adjusted even with a constant rotational speed of the pump. Various parameters are conceivable as manipulated variables. For example, a rotational speed of the drive unit for the variable displacement pump can be taken into consideration as parameter. In particular, the parameter is a matter of variables of the vehicle transmission, for example, the current hydraulic pressure, in particular the current system pressure $p\_sys$ or lubrication pressure $p\_lub$, the transmission input power, the torque or rotational speed at the transmission input, shifting operations or a selected gear, the energy intensity of the shifting operations. The respective manipulated variable can influence suitable components (for example, hydromechanically, electrohydraulically, control electronics) that adjust (i.e., continuously adjust) the variable displacement pump as appropriate. The variable displacement pumps that are used in the hydraulic arrangement can therefore be adapted in a technically simple manner to different states of the vehicle transmission and as a result reduce unnecessary power losses and improve the efficiency.

Regardless of the pump type (fixed displacement pump or variable displacement pump), the pump rotational speed and thus the hydraulic displacement volume or the volumetric flow can change depending on the drive rotational speed of a drive unit (for example, drive motor or combustion engine of the vehicle, electric motor) that drives the pump.

The pumps used can have different dimensions. In particular, a plurality of fixed displacement pumps, while having the same pump rotational speed, can have different displacement volumes or volumetric flows.

The pump combination with at least two fixed displacement pumps can have different embodiments as regards its structure. For example, the pump combination is realized with a single pump housing or with a separate pump housing for each fixed displacement pump that is present.

As a result of the above-described variable number and types of pumps within the hydraulic arrangement, the latter can be adapted in a flexible manner to different requirements of the vehicle transmission. These requirements concern, for example, appropriate system and lubrication pressures $p\_sys$, $p\_lub$, the magnitude of the hydraulic power losses, the constructional structure of the vehicle transmission or the installation conditions in the vehicle. In this way, the hydraulic arrangement and thus the vehicle transmission can be optimized in a targeted manner for the vehicle in question. This concerns both the basic structure of the hydraulic arrangement and adaptations of the hydraulic pressure ratios during the use of the vehicle transmission. For this optimization, it is possible to use components, available as standard, in the form of different types of pumps and a different number of pumps without significant additional costs.

The variable displacement pump or pump combination present at the input side of the branching point can influence the lubrication pressure $p\_lub$. By contrast, influencing the system pressure $p\_sys$ is possible by the variable displacement pump integrated into the system path or of the at least one fixed displacement pump in combination with a regulator valve.

As mentioned above, the hydraulic arrangement is used in a vehicle transmission. The vehicle is in particular a utility vehicle, for instance an agricultural utility vehicle (for example, a tractor), a forestry utility vehicle or a construction vehicle.

The hydraulic arrangement contains, at technically appropriate points, at least one of the following components or at least one of the following functional units: a suction strainer on the suction side of a pump, a filter for cleaning the hydraulic medium, a filter bypass having a differential pressure sensor or the like for checking the pressure gradient and degree of soiling of the filter, a hydraulic accumulator unit (for example, a diaphragm accumulator, accumulator), connected to the respective circuit, for pressure stabilization of the circuit (system or lubrication), pressure sensors for sensing the current system pressure $p\_sys$ and the current lubrication pressure $p\_lub$, a cooler for conditioning the hydraulic medium, a cooler bypass for limiting a pressure difference that arises at the cooler or for regulating the cooling capacity.

In one embodiment, a pump assembly is installed in or integrated into the hydraulic system path, the pump assembly having at least two fixed displacement pumps. As regards the number of pump housings, the above description applies in a corresponding manner to the pump combination.

In particular, exactly two fixed displacement pumps that are connected in parallel are provided for the pump assembly. By the pump assembly, it is possible to vary, in a more appropriate manner, the hydraulic medium (volumetric flow, displacement volume, delivery rate, etc.) to be delivered in the direction of the system circuit, without variable displacement pumps being necessary for this.

For example, a plurality of fixed displacement pumps of the pump assembly, while having the same pump rotational speed, have different displacement volumes that can be delivered to the system circuit selectively by suitable technical measures (for example, a hydraulic valve that is switchable between a plurality of switch positions). A fixed displacement pump with a higher displacement volume is used to achieve a relatively high volumetric flow in conjunction with relatively low drive rotational speeds, while a fixed displacement pump with a lower displacement volume is used to achieve a relatively low volumetric flow in conjunction with relatively high drive rotations speeds in the system circuit. In this way, a plurality of differently dimensioned fixed displacement pumps allow appropriate adaptation of the pump assembly to the system circuit while having low hydraulic power losses.

A selection valve is connected between the branching point and the input-side pump combination thereof, the selection valve having a plurality of different switch positions in order for it to be possible to realize different hydraulic connections between the pump combination and the input of the branching point. As a result, a discrete change in the volumetric flow is possible, for example, with at least two fixed displacement pumps connected in parallel and an appropriately configured selection valve at the input of the branching point. This discrete change can, in many applications, replace a continuous change in the volumetric flow by a variable displacement pump without significant losses in terms of efficiency.

In a further embodiment, a selection valve is connected to the output side of the pump assembly integrated into the system path. This selection valve has a plurality of different switch positions for different hydraulic connections between the pump assembly and the system circuit. As a result, discrete changes to the volumetric flow in the direction of the system circuit are possible in a technically simple manner. This discrete change can, in many applications, replace a continuous change in the volumetric flow by a variable displacement pump without significant losses in terms of efficiency.

The selection valve assigned to the pump combination, for the one part, and the selection valve assigned to the pump assembly, for the other part, has preferably a different number of ports or switch positions. The respective selection valve is configured for example, in a hydromechanical or electrohydraulic manner. With the selection valve, in spite of the use of fixed displacement pumps, an appropriate discrete change in the displacement volume or volumetric flow can be realized at the pump combination or the pump assembly with simultaneously low power losses.

In the case of an electrohydraulic embodiment, the respective selection valve has at least one electromagnet that is controllable depending on a sensed physical variable or a parameter in order to transfer the selection valve appropriately into its different switch positions. The sensed physical variable or the parameter is processed in particular in suitable control electronics that control the electromagnet(s) as appropriate. Suitable physical variables or parameters are, for example, rotational speed of the drive unit(s) for the fixed displacement pump(s), current hydraulic pressure such as system pressure $p\_sys$ or lubrication pressure $p\_lub$, transmission input power, torque or rotational speed at the transmission input, shifting operations or a selected gear, energy intensity of the shifting operations.

In another embodiment, a boost valve that is switchable between different switch positions is connected to the output side of the selection valve of the system path. The boost valve can hydraulically close or interrupt a parallel hydraulic secondary path between the selection valve of the system path and the system circuit depending on the current system pressure $p\_sys$. The dependence of the switch positions on the current system pressure $p\_sys$ can be realized for example, hydromechanically (for example, hydraulic control input at the boost valve) or electrohydraulically (for example, pressure sensor and control electronics for an electromagnet at the boost valve). The consideration of the current system pressure $p\_sys$ for switching the boost valve allows an accelerated and automatic supply of the system circuit with hydraulic pressure in the case of unfavorable pressure ratios (for example, at too low a system pressure $p\_sys$) in the system circuit. For this accelerated supply of the system circuit with hydraulic pressure, the selection valve of the system path and the boost valve are configured and connected such that a plurality or all of the fixed displacement pumps of the pump assembly deliver hydraulic medium to the system circuit—either directly or at least indirectly via the secondary path depending on the fixed displacement pump.

In particular, at a system pressure $p\_sys$ below a predetermined minimum system pressure $p\_sys\text{-}min$, the boost valve takes up a boost switch position in order to hydraulically close the parallel secondary path. This boost switch position corresponds to a basic position of the boost valve at a system start, for example, when starting the vehicle.

Furthermore, the boost valve is dimensioned in particular such that, starting from an increasing system pressure $p\_sys$, after the predetermined minimum system pressure $p\_sys\text{-}min$ has been reached or exceeded, it takes up another switch position for a hydraulic connection between the selection valve of the system path and the lubrication circuit. In this switch position, the hydraulic medium delivered originally for an accelerated supply of the system circuit is delivered in the direction of the lubrication circuit and thus acts advantageously for the pressure stabilization thereof.

In a further embodiment, a control valve is hydraulically connected between the system circuit and the lubrication circuit, the control valve having two different switch positions such that, depending on its switch position, the control valve acts as a hydraulic connection or a hydraulic interruption between the two circuits. As a result, it is, for example, possible to relax excessively high system pressures $p\_sys$ in a functionally appropriate manner in the direction of the lubrication circuit and consequently to further reduce power losses.

For this purpose, the control valve is dimensioned in particular such that, below a predetermined maximum system pressure $p\_sys\text{-}max$, it has a first control switch position for a hydraulic interruption between the two circuits. Starting from an increasing system pressure $p\_sys$, when the predetermined maximum system pressure $p\_sys\text{-}max$ is reached or exceeded, the control valve takes up a second control switch position for a hydraulic connection between the two circuits.

The hydraulic arrangement contains a medium cooler for cooling the hydraulic medium (for example, oil) used in the arrangement. The medium cooler can be integrated, for example, into the lubrication path or lubrication circuit such that pressure losses caused by a medium cooler are avoided in the system circuit. Alternatively, the medium cooler can be hydraulically connected between the branching point and the input-side variable displacement pump or pump combination thereof. Given acceptable pressure losses, the medium cooler can also be integrated into the system path or system circuit.

In particular, however, the medium cooler is arranged hydraulically between the system circuit and the lubrication circuit. As a result, pressure losses caused by the medium cooler are avoided both in the system circuit and in the lubrication circuit. Moreover, by a suitable valve arrangement between the system circuit and the lubrication circuit, it is possible to ensure that, at high system pressures p_sys that are not required, excess hydraulic medium of the system circuit flows off into the lubrication circuit via the medium cooler. The hydraulic medium flowing off is automatically cooled and at the same time contributes to pressure stabilization in the lubrication circuit.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
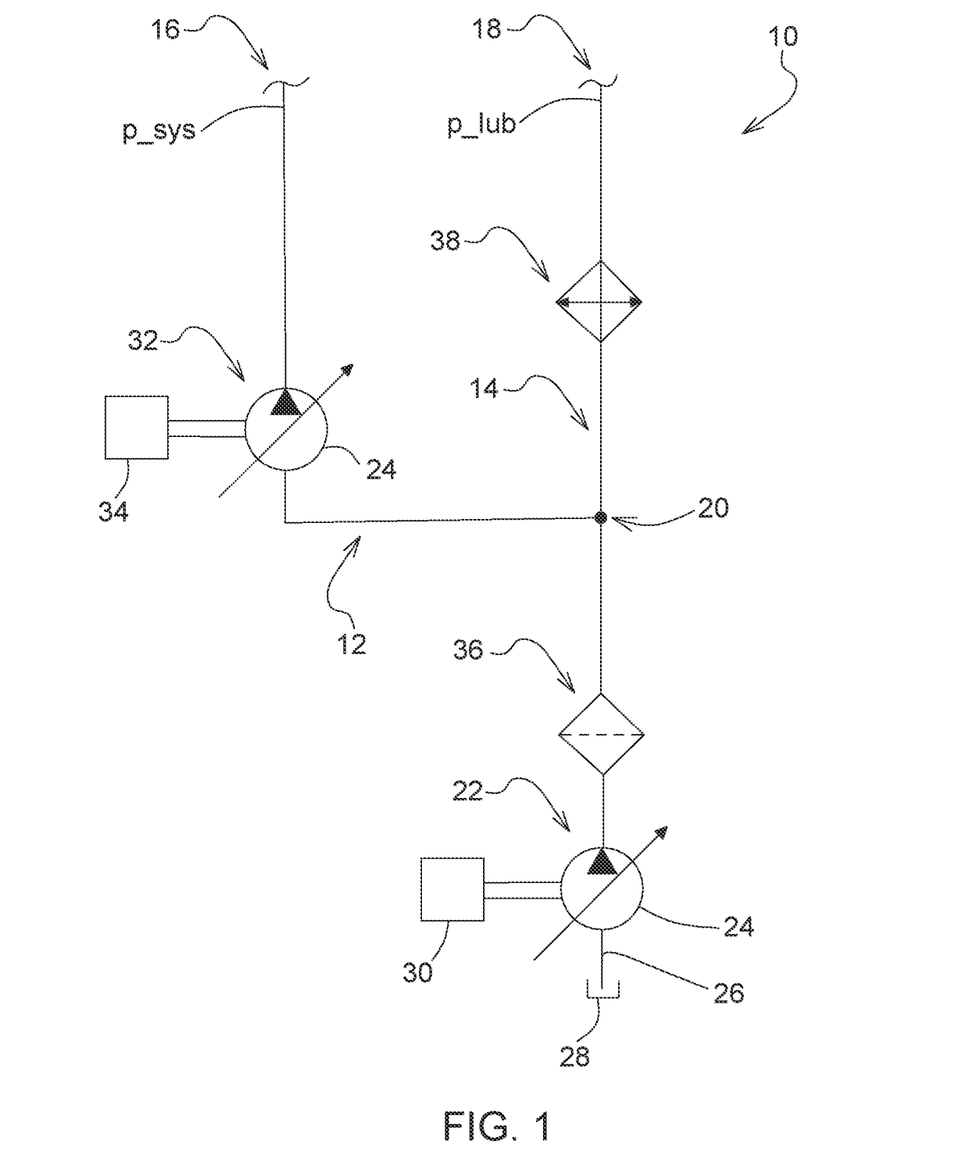
FIG. 1 shows a hydraulic circuit diagram with the hydraulic arrangement in a first embodiment.

FIG. 1 shows a hydraulic arrangement 10 for a transmission unit, not explicitly illustrated here, of a vehicle, i.e., a vehicle transmission. The arrangement 10 can be arranged partially inside and partially outside the transmission unit or entirely inside the transmission unit.

The arrangement 10 has a hydraulic system path 12 and a hydraulic lubrication path 14. The system path 12 leads to a hydraulic system circuit 16 with a current system pressure p_sys. The lubrication path 14 leads to a hydraulic lubrication circuit 18 with a current lubrication pressure p_lub.

The system circuit 16 leads to at least one transmission clutch and optionally further components, for instance a selector fork. The lubrication circuit 18 serves for continuous lubrication of the relevant components of the transmission unit.

The arrangement 10 contains a hydraulic branching point 20, to the output side of which the two paths 12, 14 are hydraulically connected. On the input side, a central pump 22 in the form of a variable displacement pump 24 is hydraulically connected to the branching point 20. The central pump 22 delivers a hydraulic medium (for example, oil) in the direction of the system path 12 and of the lubrication path 14. The central pump 22 is connected by a suction line 26 to a hydraulic reservoir 28 or sump containing the hydraulic medium. The central pump 22 is driven by a central drive unit 30 (for example, drive motor or combustion engine of the vehicle, electric motor).

Integrated into the system path 12 is a system pump 32 in the form of a further variable displacement pump 24. It delivers hydraulic medium in the direction of the system circuit 16 and is driven by a system drive unit 34 (for example, a drive motor or combustion engine of the vehicle, an electric motor, etc.).

The central drive unit 30 and the system drive unit 34 can be physically different drive units or a single drive unit, which is used for driving both pumps 22, 32. The two pumps 22, 32 can be dimensioned identically or differently.

In FIG. 1, for cleaning the hydraulic medium, a filter 36 hydraulically connected between the branching point 20 and the central pump 22 is provided. A medium cooler 38 for cooling the hydraulic medium is integrated into the lubrication path 14. In contrast to the illustration in FIG. 1, the medium cooler 38 can also be hydraulically connected between the branching point 20 and the central pump 22.

Figure 2:
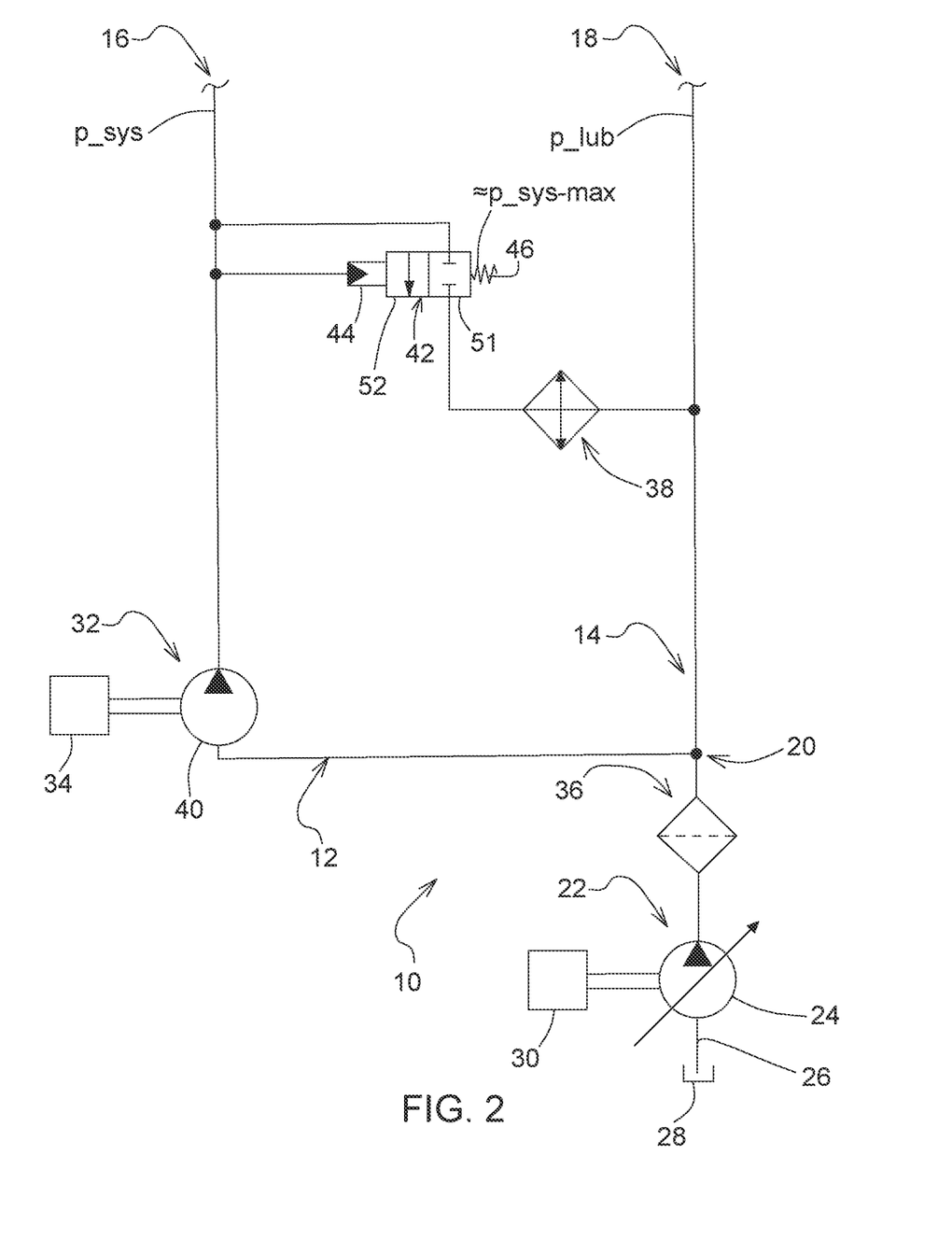
FIG. 2 shows a hydraulic circuit diagram with the hydraulic arrangement in a further embodiment.

The embodiment of the arrangement 10 according to FIG. 2 differs from the variant according to FIG. 1, inter alia, in that the system pump 32 is in the form of a fixed displacement pump 40. Moreover, a control valve 42 is hydraulically connected between the system circuit 16 and the lubrication circuit 18. It is in the form of a 2/2-way valve with two ports and two different switch positions.

Depending on the current system pressure p_sys, the control valve 42 brings about either a hydraulic connection or a hydraulic interruption between the system circuit 16 and the lubrication circuit 18. For this purpose, the control valve 42 has a control input 44, at which the current system pressure p_sys is present. The spring pressure of a restoring spring 46 acts counter to the pressure at the control input 44. This spring pressure is set approximately to a predetermined maximum system pressure p_sys-max.

In FIG. 2, the control valve 42 is in its basic position (first control switch position S1), which brings about a hydraulic interruption between the two circuits 16, 18. In this case, the current system pressure p_sys is below the predetermined maximum system pressure p_sys-max. As soon as an increasing system pressure p_sys reaches or exceeds the spring pressure of the restoring spring 46, or the predetermined maximum system pressure p_sys-max, the control valve 42 is transferred into its second control switch position S2. This second control switch position S2 brings about a hydraulic connection between the two circuits 16, 18. As a result, the lubrication circuit 18 can be supplied with excess hydraulic medium from the system circuit in a pressure-stabilizing manner. Advantageously, excessively high system pressures p_sys in the system circuit 16 are automatically avoided. Power losses of the vehicle transmission are reduced and the efficiency thereof increased.

In the arrangement 10 according to FIG. 2, the medium cooler 38 is hydraulically arranged between the output of the control valve 42 and the lubrication circuit 18. As a result, compared with the embodiment according to FIG. 1, pressure losses in the lubrication circuit 18 are avoided.

Figure 3:
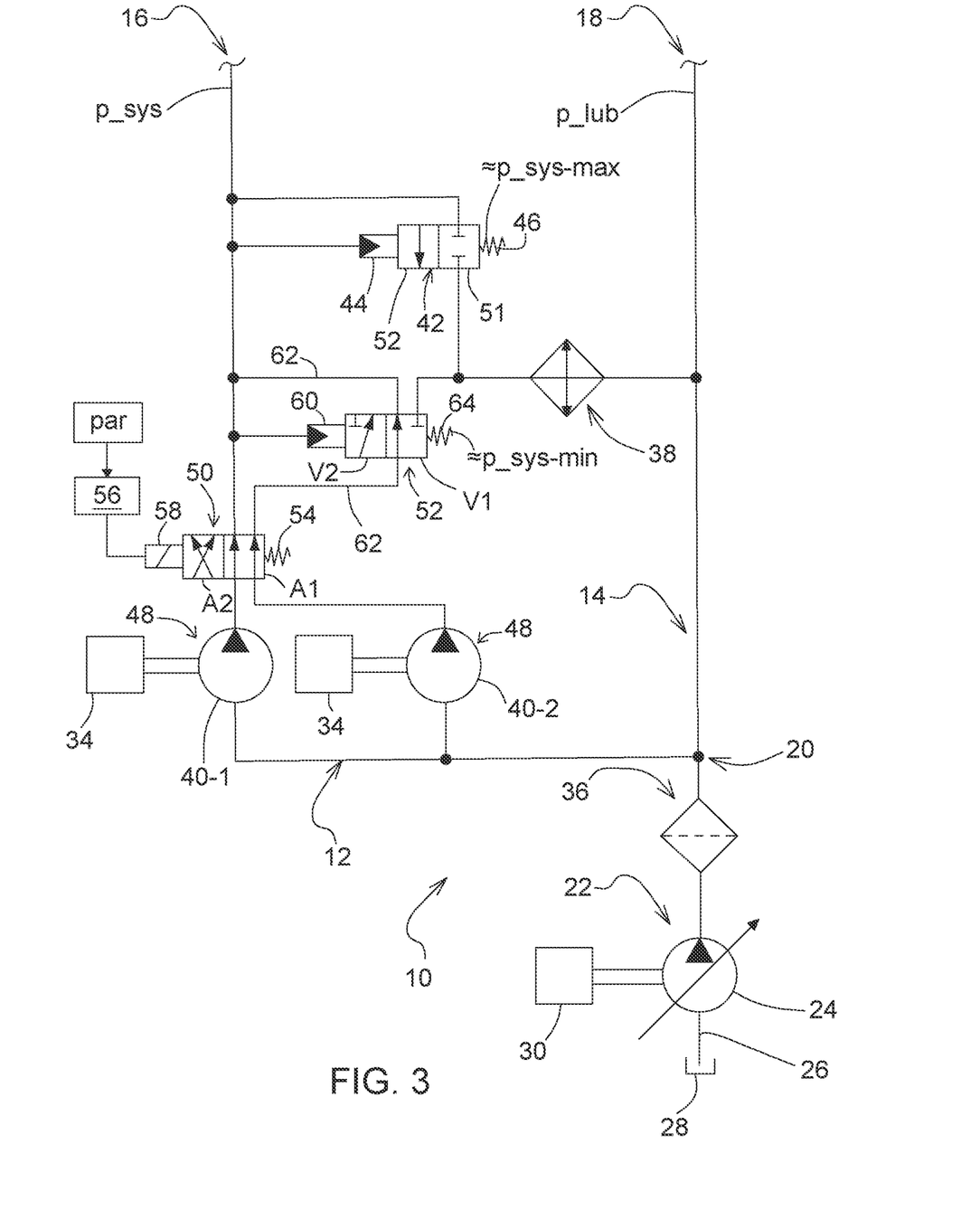
FIG. 3 shows a hydraulic circuit diagram with the hydraulic arrangement in a further embodiment.

The embodiment of the arrangement 10 according to FIG. 3 differs from the variant according to FIG. 2 in that the system pump 32 has been replaced by a pump assembly 48 having two fixed displacement pumps 40-1, 40-2. Moreover, a selection valve 50 is hydraulically connected to the output side of the pump assembly 48. In addition, a boost valve 52 is hydraulically connected to the output side of the selection valve 50.

The selection valve 50 of the system path 12 is in the form of a 4/2-way valve with four ports and two switch positions. As a result of the selection valve 50 being switched, the volumetric flow flowing to the system circuit 16 or the displacement volume of the pump assembly 48 can be discretely adjusted. In this case, it is advantageous for the two fixed displacement pumps 40-1, 40-2 not to be for instance identical in terms of their displacement volume, but rather to be dimensioned differently. The first fixed displacement pump 40-1 is dimensioned for a high displacement volume (use at relatively low drive rotational speeds), while the second fixed displacement pump 40-2 is dimensioned for a low displacement volume (use at relatively high drive rotational speeds).

By the switching of the selection valve 50, it is possible to select which constant pump 40-1 and 40-2 is directly connected hydraulically to the system circuit 16 for the pressure supply thereof. In the basic position (selection switch position A1) according to FIG. 3, the first fixed displacement pump 40-1 is directly connected hydraulically to the system circuit 16.

The selection valve 50 is kept in its selection switch position A1 by the spring pressure of a restoring spring 54. Control electronics 56 act on or activate an electromagnet 58 of the selection valve 50 in order to transfer the latter into its second selection switch position A2. The control electronics 56 activate and deactivate the electromagnet 58 depending on at least one sensed physical variable or parameter par. Suitable parameters include, for example, the rotational speed of the drive units 34 for the fixed displacement pumps 40-1, 40-2, a current hydraulic pressure such as the system pressure p_sys or lubrication pressure p_lub, a transmission input power, a torque or a rotational speed at the transmission input, shifting operations or a selected gear, the energy intensity of the shifting operations. As a result, a flexible and appropriate pressure supply of the system circuit 16 is possible with a correspondingly advantageous reduction in hydraulic power losses.

The current system pressure p_sys is present at a control input 60 of the boost valve 52. As a result, depending on the current system pressure p_sys, the boost valve 52 can hydraulically close or interrupt a parallel hydraulic secondary path 62 between the selection valve 50 of the system path 12 and the system circuit 16. In FIG. 3, the boost valve 52 takes up its basic position (boost switch position V1), in which the secondary path 62 is hydraulically closed. As soon as the boost valve 52 takes up its second boost switch position V2, the secondary path 62 is hydraulically interrupted. In this way, in its first switch position V1, the boost valve 52 can bring about a quicker supply of the system circuit 16 with higher hydraulic pressure. This is appropriate, for example, when the current system pressure p_sys is below a predetermined minimum system pressure p_sys-min. In that case, the boost valve 52 takes up its first switch position V1 when the restoring spring 64 thereof is set approximately to the value of the predetermined minimum system pressure p_sys-min. With an increasing system pressure p_sys, after the predetermined minimum system pressure p_sys-min has been reached or exceeded, the boost valve 52 can take up its second boost switch position V2. This switch position V2 brings about a hydraulic connection between the selection valve 50 and the lubrication circuit 18, such that hydraulic medium that is no longer required for the system circuit 16 can be made available to the lubrication circuit 18.

Figure 4:
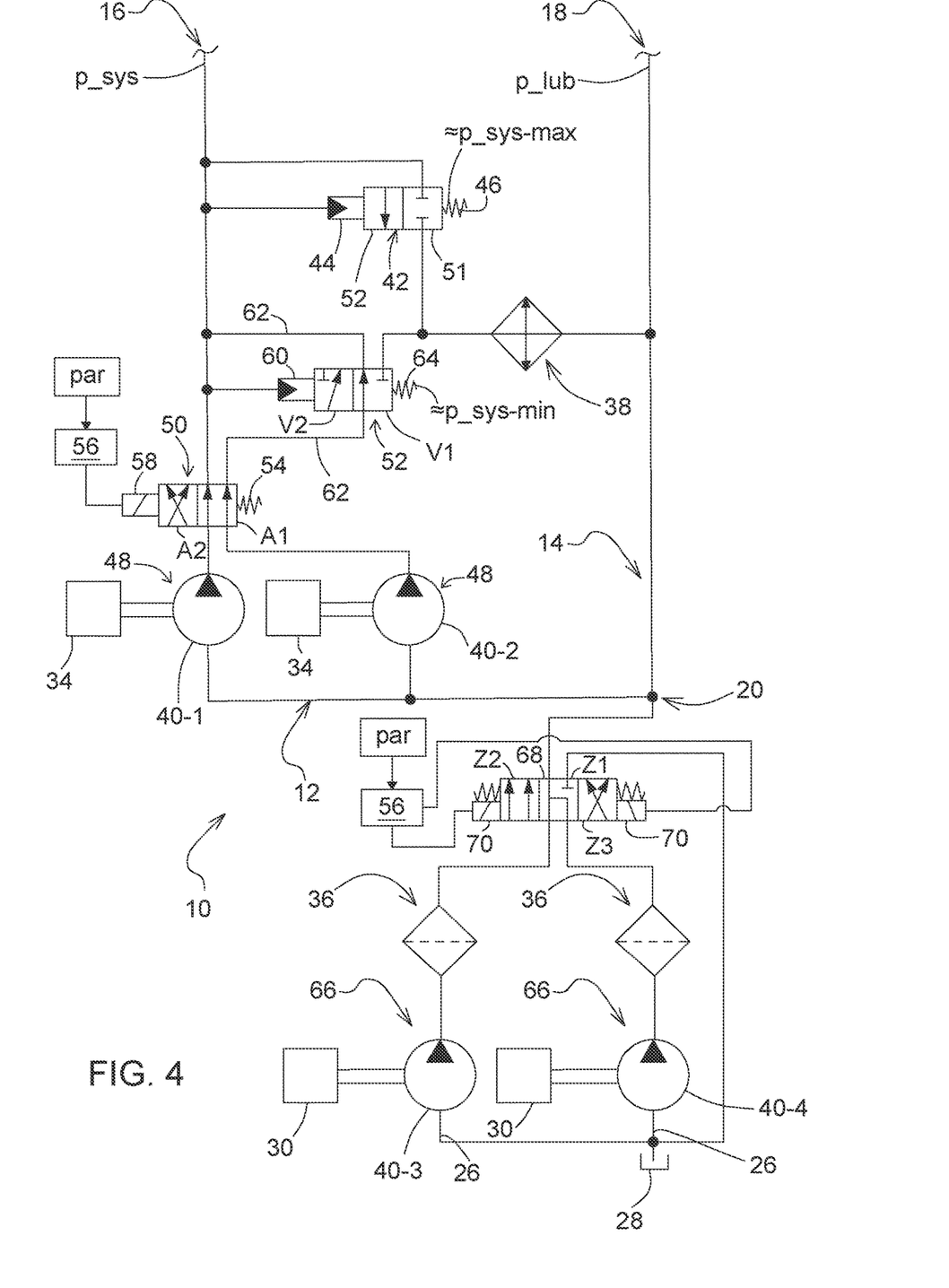
FIG. 4 shows a hydraulic circuit diagram with the hydraulic arrangement in a further embodiment.

The embodiment of the arrangement 10 according to FIG. 4 differs from the variant according to FIG. 3 in that the central pump 22 has been replaced by a pump combination 66 with two fixed displacement pumps 40-3, 40-4. Moreover, a central selection valve 68 is hydraulically connected between the branching point 20 and the pump combination 66. This is in the form of a 4/3-way valve with four ports and three different switch positions Z1, Z2, Z3. Furthermore, a filter 36 for cleaning the hydraulic medium is connected to the output of each of the two fixed displacement pumps 40-3, 40-4.

By the central selection valve 68, the hydraulic medium delivered by the pump combination 66 in the direction of the lubrication circuit 18 can be discretely adjusted in terms of displacement volume or volumetric flow. As a result, the lubrication circuit 18 can be supplied appropriately with hydraulic pressure and the hydraulic pressure losses can be reduced. According to the three different switch positions Z1, Z2, Z3 of the central selection valve 68, three different values of the total displacement volume or of the total volumetric flow of the pump combination 66 can be provided, namely the volumetric flow of the fixed displacement pump 40-3 or of the fixed displacement pump 40-4 or the sum of the volumetric flows of both fixed displacement pumps 40-3, 40-4. In this case, the two fixed displacement pumps 40-3, 40-4 are dimensioned differently in terms of their displacement volume or volumetric flow.

The different switch positions Z1, Z2, Z3 of the central selection valve 68 generate different hydraulic connections between the pump combination 66 and the branching point 20. For the discrete adjustment of the total displacement volume or of the total volumetric flow of the pump combination 66, two electromagnets 70 of the central selection valve 68 are controlled by the control electronics 56 (or some other suitable control electronics) and as a result activated or deactivated. This control takes place depending on a sensed physical variable or parameter par. Suitable parameters are, for example, the rotational speed of the drive units 30 for the fixed displacement pumps 40-3, 40-4, a current hydraulic pressure such as the system pressure p_sys or lubrication pressure p_lub, a transmission input power, a torque or rotational speed at the transmission input, shifting operations or a selected gear, the energy intensity of the shifting operations. As a result, a flexible and appropriate pressure supply of the lubricant circuit 18 is possible with a correspondingly advantageous reduction in hydraulic power losses. Moreover, the discrete adjustment of the pump combination 66 can also support an appropriate pressure supply of the system circuit 16.

It should be noted that the details disclosed in the drawings are illustrated in a partially schematic manner and not necessarily in a manner true to scale.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A hydraulic arrangement for a vehicle transmission, comprising:
   a hydraulic system path leading to a hydraulic system circuit with a system pressure;
   a hydraulic lubrication path leading to a hydraulic lubrication circuit with a lubrication pressure;
   a branching point connected to an output side of the hydraulic system and hydraulic lubrication paths;
   a pump combination hydraulically connected to an input side of the branching point, and
   a pump assembly hydraulically connected to the output side of the branching point and integrated into the hydraulic system path; and
   a first selection valve connected to the output side of the pump assembly.

2. The arrangement as claimed in claim 1, wherein the pump assembly includes at least two fixed displacement pumps.

3. The arrangement as claimed in claim 1, further comprising a second selection valve connected between the branching point and the pump combination.

4. The arrangement as claimed in claim 3, wherein the second selection valve comprises a plurality of different switch positions for different hydraulic connections between the pump combination and the branching point.

5. The arrangement as claimed in claim 1, wherein the pump combination includes at least two fixed displacement pumps.

6. The arrangement as claimed in claim 1, wherein the first selection valve comprises a plurality of different switch positions for different hydraulic connections of the pump assembly to the hydraulic system circuit.

7. The arrangement as claimed in claim 1, wherein the first selection valve comprises at least one electromagnet that is controllable based on a sensed physical variable.

8. The arrangement as claimed in claim 1, further comprising a boost valve switchable between different switch positions and connected to an output side of the first selection valve of the hydraulic system path.

9. The arrangement as claimed in claim 8, wherein the boost valve hydraulically closes or interrupts a parallel secondary path between the first selection valve of the hydraulic system path and the hydraulic system circuit based on the system pressure.

10. The arrangement as claimed in claim 8, wherein:
    at a system pressure below a predetermined minimum system pressure, the boost valve comprises a boost switch position for hydraulically closing the secondary path; and,
    starting from an increasing system pressure, after the predetermined minimum system pressure has been reached or exceeded, the boost valve takes up another switch position for a hydraulic connection between the first selection valve of the hydraulic system path and the hydraulic lubrication circuit.

11. The arrangement as claimed in claim 1, further comprising a control valve hydraulically connected between the hydraulic system circuit and the hydraulic lubrication circuit, the control valve comprising two different switch positions such that, depending on its switch position, the control valve acts as a hydraulic connection or interruption between the two circuits.

12. The arrangement as claimed in claim 11, wherein:
    at a system pressure below a predetermined maximum system pressure, the control valve comprises a first control switch position for a hydraulic interruption between the two circuits, and
    starting from an increasing system pressure, when the predetermined maximum system pressure is reached or exceeded, the control valve moves to a second control switch position for a hydraulic connection between the two circuits.

13. The arrangement as claimed in claim 1, further comprising a medium cooler arranged between the hydraulic system circuit and the hydraulic lubrication circuit for cooling a hydraulic medium.

14. A hydraulic arrangement for a vehicle transmission, comprising:
    a hydraulic system path leading to a hydraulic system circuit with a system pressure;
    a hydraulic lubrication path leading to a hydraulic lubrication circuit with a lubrication pressure;
    a branching point connected to an output side of the hydraulic system and hydraulic lubrication paths;
    a pump combination having first and second fixed displacement pumps hydraulically connected to an input side of the branching point;
    a pump assembly having third and fourth fixed displacement pumps hydraulically connected to the output side of the branching point and integrated into the hydraulic system path;
    a first selection valve connected between the branching point and the pump combination; and
    a second selection valve connected to the output side of the pump assembly.

15. The arrangement as claimed in claim 14, wherein the first selection valve comprises a plurality of different switch positions for different hydraulic connections between the pump combination and the branching point.

16. The arrangement as claimed in claim 14, wherein the second selection valve comprises a plurality of different switch positions for different hydraulic connections of the pump assembly to the hydraulic system circuit.

17. The arrangement as claimed in claim 14, wherein the first or second selection valve comprises at least one electromagnet that is controllable based on a sensed physical variable.

18. The arrangement as claimed in claim 14, further comprising a boost valve switchable between different switch positions and connected to an output side of the second selection valve, the boost valve hydraulically closing a parallel secondary path between the second selection valve of the hydraulic system path and the hydraulic system circuit based on the system pressure.

19. The arrangement as claimed in claim 14, further comprising a control valve hydraulically connected between the hydraulic system circuit and the hydraulic lubrication circuit, the control valve comprising two different switch positions such that, depending on its switch position, the control valve acts as a hydraulic connection or interruption between the two circuits.

20. A hydraulic arrangement for a vehicle transmission, comprising:
    a hydraulic system path leading to a hydraulic system circuit with a system pressure;
    a hydraulic lubrication path leading to a hydraulic lubrication circuit with a lubrication pressure;
    a branching point connected to an output side of the hydraulic system and hydraulic lubrication paths;
    a pump combination having first and second fixed displacement pumps hydraulically connected to an input side of the branching point;

a pump assembly having third and fourth fixed displacement pumps hydraulically connected to the output side of the branching point and integrated into the hydraulic system path;

a first selection valve connected between the branching point and the pump combination;

a second selection valve connected to the output side of the pump assembly;

a boost valve switchable between different switch positions and connected to an output side of the second selection valve, the boost valve hydraulically closing a parallel secondary path between the second selection valve of the hydraulic system path and the hydraulic system circuit based on the system pressure; and a control valve hydraulically connected between the hydraulic system circuit and the hydraulic lubrication circuit, the control valve comprising two different switch positions such that, depending on its switch position, the control valve acts as a hydraulic connection or interruption between the two circuits.

21. A hydraulic arrangement for a vehicle transmission, comprising:

a hydraulic system path leading to a hydraulic system circuit with a system pressure;

a hydraulic lubrication path leading to a hydraulic lubrication circuit with a lubrication pressure;

a branching point connected to an output side of the hydraulic system and hydraulic lubrication paths;

a medium cooler arranged between the hydraulic system circuit and the hydraulic lubrication circuit for cooling a hydraulic medium;

a pump combination hydraulically connected to an input side of the branching point; and a pump assembly hydraulically connected to the output side of the branching point and integrated into the hydraulic system path.

* * * * *